(12) United States Patent
Kami

(10) Patent No.: US 8,938,357 B2
(45) Date of Patent: Jan. 20, 2015

(54) CHARACTERISTIC POINT DETECTION SYSTEM, CHARACTERISTIC POINT DETECTION METHOD, AND PROGRAM

(75) Inventor: Nobuharu Kami, Minato-ku (JP)

(73) Assignee: NEC Corporation, Tokyo (JP)

( * ) Notice: Subject to any disclaimer, the term of this patent is extended or adjusted under 35 U.S.C. 154(b) by 274 days.

(21) Appl. No.: 13/696,765

(22) PCT Filed: Apr. 21, 2011

(86) PCT No.: PCT/JP2011/059790
§ 371 (c)(1),
(2), (4) Date: Nov. 7, 2012

(87) PCT Pub. No.: WO2011/142225
PCT Pub. Date: Nov. 17, 2011

(65) Prior Publication Data
US 2013/0054602 A1 Feb. 28, 2013

(30) Foreign Application Priority Data
May 12, 2010 (JP) .................. 2010-110361

(51) Int. Cl.
*G06F 17/30* (2006.01)
*G01C 21/26* (2006.01)

(52) U.S. Cl.
CPC .......... *G01C 21/26* (2013.01); *G06F 17/30241* (2013.01)
USPC ........................... 701/468; 701/32.4; 707/737

(58) Field of Classification Search
USPC .................................. 701/468, 32.4; 707/737
See application file for complete search history.

(56) References Cited

U.S. PATENT DOCUMENTS 6,400,690 B1* 6/2002 Liu et al. ................... 370/252
6,975,939 B2* 12/2005 Edwards et al. ............. 701/518
(Continued)

FOREIGN PATENT DOCUMENTS

JP     2003-044512 A    2/2003
JP     2006-23793 A     1/2006
(Continued)

OTHER PUBLICATIONS

Kamisaka, et al., "Estimation Method of Homes and Offices from Location Data Obtained by Mobile Phones", IEICE, Mar. 19, 2010, 2 Pages.
(Continued)

*Primary Examiner* — Mary Cheung
*Assistant Examiner* — Michael Berns
(74) *Attorney, Agent, or Firm* — Sughrue Mion, PLLC

(57) ABSTRACT

The characteristic point detection system of this invention includes: a staying area detection unit 1003 which performs clustering based on distribution of data points contained in GPS log data of a user, determines an index showing a staying time of the user in a cluster based on a number of data points contained in each cluster, extracts one or more clusters based on the index, and forms a staying area of the user based on the extracted clusters, wherewith a cluster is extracted with higher probability as the staying time is longer; a representative point extraction unit 1004 which extracts, one at a time, a representative point of the staying area from each of the extracted staying areas, and determines a score of each of the representative points based on density of the data points in each of the staying areas; and an output unit 1005 which outputs a list ranking each of the representative points based on the score.

13 Claims, 10 Drawing Sheets

(56) References Cited

U.S. PATENT DOCUMENTS

| | | | |
|---|---|---|---|
| 7,353,109 B2* | 4/2008 | Han | 701/408 |
| 7,747,625 B2* | 6/2010 | Gargi et al. | 707/737 |
| 8,494,550 B2* | 7/2013 | Wigren | 455/456.1 |
| 2005/0027712 A1* | 2/2005 | Gargi et al. | 707/100 |
| 2006/0238409 A1 | 10/2006 | Yoshioka et al. | |
| 2009/0150024 A1 | 6/2009 | Kojima et al. | |
| 2010/0087198 A1* | 4/2010 | Wigren | 455/446 |

FOREIGN PATENT DOCUMENTS

| | | |
|---|---|---|
| JP | 2007-148517 A | 6/2007 |
| JP | 2009-139231 A | 6/2009 |
| JP | 2009-230514 A | 10/2009 |
| JP | 2010-72828 A | 4/2010 |
| JP | 2010-96890 A | 4/2010 |
| WO | 2006/040901 A1 | 4/2006 |

OTHER PUBLICATIONS

Toyama, et al., "A Prediction System based on Context Information and Operation Histories", IPSJ SIG Technical Report, Nov. 10, 2004, 9 Pages.

Daniel Ashbrook, et al., "Using GPS to learn significant locations and predict movement across multiple users", Personal and Ubiquitous Computing, 2003, pp. 275-286, vol. 7.

Ramaswamy Hariharan, et al.., "Project Lachesis: Parsing and Modeling Location Histories", Geographic Information Science, 2004, pp. 106-124, LNCS 3234.

Yu Zheng, et al., "Learning Transportation Mode from Raw GPS Data for Geographic Application on the Web", Associations for Computing Machinery, Inc., Apr. 20, 2008, 10 pages.

* cited by examiner

CHARACTERISTIC POINT DETECTION SYSTEM, CHARACTERISTIC POINT DETECTION METHOD, AND PROGRAM

CROSS REFERENCE TO RELATED APPLICATIONS

This application is a National Stage of International Application No. PCT/JP2011/059790, filed on Apr. 21, 2011, which claims priority from Japanese Patent Application No. 2010-110361, filed on May 12, 2010, the contents of all of which are incorporated herein by reference in their entirety.

BACKGROUND

The present invention relates to a characteristic point detection system, a characteristic point detection method, and a program with respect to GPS log data.

In recent years, pursuant to the popularization of smartphones and GPS loggers, users can now easily acquire GPS (Global Positioning System) data upon going out. Moreover, it is also possible to use a computer program which maps the acquired GPS data on a map and display the track of the outing, and upload such track on a blog or the like for sharing. As this kind of program, there are various types including package software in which map information is previously registered, and those which upload log data to a server by using an ISP (Internet Service Provider) or various types of API (Application Program Interface) or the like that are available, and display the track on a map by using a Web browser. The foregoing types of software all display data (hereinafter referred to as the "GPS log data") such as the measurement coordinate data and time acquired by using the GPS system as visual information such as a map.

Nevertheless, generally speaking, since the GPS log data is data that was acquired mechanically according to given rules such as acquisition at given time intervals and the respective data points themselves only have a meaning as a single spot, even if these data points are displayed on the map, the track of the acquired data points is merely displayed. Thus, when using the GPS log data, the user is often required to process data. As a typical example of processing data, when a user is to share information of one's trip on a blog, there are cases where the sightseeing destinations, restaurants used, landmarks where photos were taken and other locations that are more important than other locations (hereinafter referred to as the "waypoints") are emphasized on the map, or related information is added by posting a link to that point.

As a conventional method of re-processing the GPS log data, there is manual editing by a user or automatic processing by a computer program. Manual editing by a user is performed, for example, by selecting the corresponding location on the map with a mouse pointer or the like by using a GUI interface, and intuitively adding or editing the waypoints. Consequently, the user can create the waypoints freely based on one's memory while viewing the map on which the track of the GPS log data is plotted.

Moreover, as the automatic processing by a computer program, there is, for example, coordination with a database. Waypoint candidate spots such as restaurants and sightseeing spots are registered in a database in advance, and areas that are close to the registered spots, in terms of distance, are extracted as candidates from the track of the GPS log data. In addition, certain candidates among the extracted candidates are displayed based on some kind of policy, and then selected by the user. For example, considered may be ranking the respective spots based on popularity, and displaying the top N-number of spots.

Moreover, as another example of automatic processing by a computer program, there is a method of detecting and displaying pots in which the speed or acceleration changed considerably (Non-Patent Documents 1 to 3). According to this method, since it is possible to detect spots where the user switched from walking to taking a car or train, key transits, shopping centers and the like can be displayed.

Non-Patent Document 1: D. Ashbrook and T. Starner, "Using GPS to learn significant locations and predict movement across multiple users", Personal and Ubiquitous Computing, 7(5), 2003

Non-Patent Document 2: Hariharan, R., Toyama, K., "Project Lachesis: parsing and modeling location histories", M. J. Egenhofer, C. Freksa, and H. J. Miller (Eds.): Geographic Information Science 2004, LNCS 3234, pp 106-124

Non-Patent Document 3: Yu Zheng and Xing Xie, "Learning Transportation Mode from Raw GPS Data for Geographic Application on the Web", Association for Computing Machinery, Inc., 20 Apr. 2008

Nevertheless, with the conventional methods, it is difficult to display waypoints efficiently and with high responsiveness and accuracy. With the manual editing by a user, it is necessary to extract the corresponding location from the track on the map based on the user's memory, but this is generally a troublesome task. This is because it is not easy to accurately position all locations that the user stopped at on the map.

Moreover, even with the method of coordinating with a database, the locations that may become a waypoint will differ depending on the user, and, even when it is the same user, locations that are meaningful to that user will differ from moment to moment. Thus, it is difficult to select appropriate waypoints for each user by using a database that is registered with waypoint candidates. Thus, the detection accuracy of waypoints is not necessarily high.

In addition, since the distance between all points of the GPS log data and all points registered in the database need to be calculated in principle, it is extremely costly. While methods of reducing the computational effort may be considered; for instance, initially detecting the range of the track of the GPS log data and limiting the search range to the foregoing range, or narrowing the search range based on the user's preference information or the like, since the computational effort increases non-linearly relative to the increase in the data amount, it is anticipated that the processing time will be long for large databases and GPS log data.

Moreover, with the method of detecting the changes in speed or acceleration, whether the change is large is generally determined using a threshold, but it is generally difficult to find the appropriate threshold which corresponds to various types of GPS log data, and this method is also easily affected by noise. In order to improve the accuracy, after performing the determination processing using a threshold, it is necessary to additionally perform the narrowing processing of candidates, and the processing becomes complicated.

SUMMARY

An exemplary object of the present invention is to provide a characteristic point detection system, a characteristic point detection method, and a program capable of detecting appropriate waypoints from the GPS log data in a highly accurate and responsive manner.

The characteristic point detection system according to the present invention comprises a staying area detection unit which performs clustering based on distribution of data points contained in GPS log data of a user, determines an index showing a staying time of the user in a cluster based on the number of data points contained in each cluster, extracts one or more clusters based on the index, and forms a staying area of the user based on the extracted clusters, wherewith a cluster is extracted with higher probability as the staying time is longer, a representative point extraction unit which extracts, one at a time, a representative point of the staying area from each of the extracted staying areas, and determines a score of each of the representative points based on density of the data points in each of the staying areas, and a representative point ranking unit which outputs a list ranking each of the representative points based on the score.

According to an exemplary aspect of the present invention, it is possible to detect appropriate waypoints from the GPS log data in a highly accurate and responsive manner.

EXEMPLARY EMBODIMENT

Exemplary embodiments of the present invention are now explained in detail with reference to the drawings.

Figure 1:
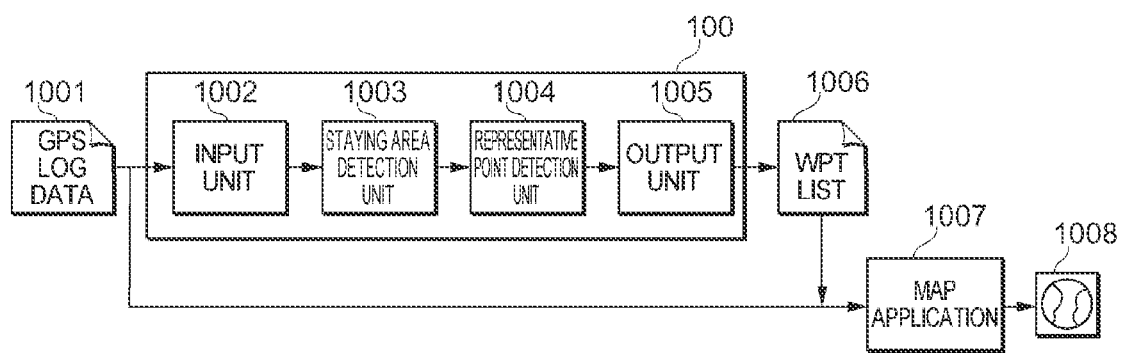
FIG. 1 is a block diagram showing a configuration of the characteristic point detection system of the GPS log data according to an embodiment of the present invention.

FIG. 1 is a block diagram showing a configuration of a characteristic point detection system 100 of GPS log data according to an embodiment of the present invention. As shown in FIG. 1, the characteristic point detection system 100 comprises an input unit 1002, a staying area detection unit 1003, a representative point extraction unit 1004, and an output unit 1005. The input unit 1002, the staying area detection unit 1003, the representative point extraction unit 1004, and the output unit 1005 represent modules for the operation to be performed by a processor of a computer according to a program.

The input unit 1002 acquires, from the input GPS log data 1001, information of the respective data points (hereinafter referred to as the "data point information") including position information and time information, and converts the data point information into an operable format.

The GPS log data 1001 is data described in a data format such as GPGGA acquired via a GPS system. The GPS log data includes at least position information and time information. More preferably, the GPS log data 1001 is an aggregate of data containing at least the latitude, longitude, altitude, and measurement time information measured by the GPS system.

The staying area detection unit 1003 performs clustering based on the distribution of the converted data points, determines the index showing the staying time of the user in that cluster based on the number of data points contained in the respective clusters, extracts one or more clusters based on the index, and forms the staying area of the user based on the extracted clusters, wherewith a cluster is extracted with higher probability as the staying time is longer. In an area where it is deemed that the user stayed for a given period of time (hereinafter referred to as the "staying area"), since the data points are congested temporally and spatially, an area in which the density of the data points is high is detected with higher probability.

The representative point extraction unit 1004 extracts, from the staying area detected by the staying area detection unit 1003, a point that represents the staying area as a waypoint. The representative point is typically a point that is located centermost in the area. For example, the representative point extraction unit 1004 selects a point where the square sum of the distances to all data points in the area becomes lowest. This point is the average value of all data points in the area, and it does not necessary mean that a data point actually exists at that position. Upon selecting from actually existing data points, the representative point extraction unit 1004 may select the data point that is closest from the average value.

Moreover, the representative point extraction unit 1004 calculates the score of the selected waypoint. The score is set so that the score will be higher as the density of the data points in the area is higher.

An example of the score calculation method is now explained. Foremost, the representative point extraction unit 1004 sets a higher score for the waypoints having a large number of data points in the area. In addition, based on the sum (or average) of the squared distance from the waypoint to all data points in the area, waypoints having higher density (smaller sum of the squared distance) are set to have a higher score even when the number of data points in the area is the same.

The output unit (representative point ranking unit) 1005 outputs a list (WPT list 1006) of waypoints that were ranked based on the scores calculated by the representative point extraction unit 1004.

The WPT list 1006 is a list of waypoints that was generated according to the computer program such as the map application 1007 to use the WPT list 1006. The WPT list 1006 is described, for example, in a markup language such as HTML or XML, and contains formats and data defined by tags and formats and data of CSV and the like.

The map application 1007 is a software program for generating the output data 1008 in order to display an image on the map which combines the track information obtained from the GPS log data 1001 and the waypoint information obtained from the WPT list 1006. The map application 1007 may use, as needed, an API that is provided via the internet or the like.

The output data 1008 is graphic data that is generated so that the user can visually recognize the waypoints. The output data 1008 is used for displaying, on the map, track data obtained from the GPS log data 1001, and emphasizing and displaying the waypoints contained in the WPT list 1006 on the track.

The staying area detection unit 1003 is now explained in detail.

Note that, here, while a three-dimensional space configured from latitude, longitude, and altitude is considered, the number of dimensions is not limited thereto. For example, the number of dimensions may be increased such as expanding the three-dimensional space to a four-dimensional space added with time, so as long as the closeness of the distance between two points in that space can be associated with the density of the points. In particular, being temporally close is important from the perspective of staying, and consideration may also be given to the time axis by converting the difference in time into the difference of spatial distance.

Figure 2:
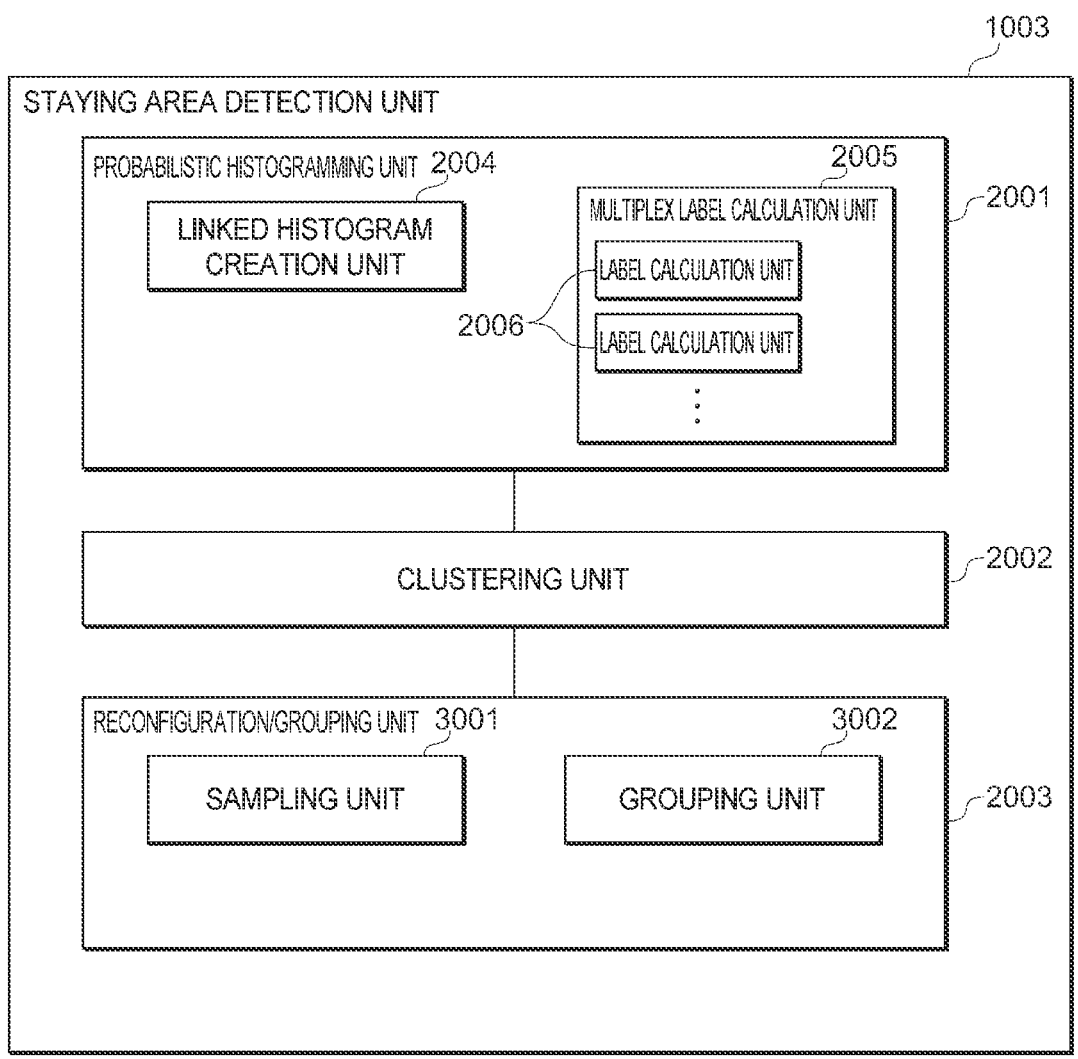
FIG. 2 is a block diagram showing a configuration of the staying area detection unit according to an embodiment of the present invention.

FIG. 2 is a block diagram showing a configuration of the staying area detection unit 1003. As shown in the diagram, the staying area detection unit 1003 comprises a probabilistic histogramming unit 2001, a clustering unit 2002, and a reconfiguration/grouping unit 2003. The probabilistic histogramming unit 2001 comprises a linked histogram creation unit 2004, and a multiplex label calculation unit 2005. The multiplex label calculation unit 2005 comprises a plurality of label calculation units 2006. The reconfiguration/grouping unit 2003 comprises a sampling unit 3001 and a grouping unit 3002.

Figure 3:
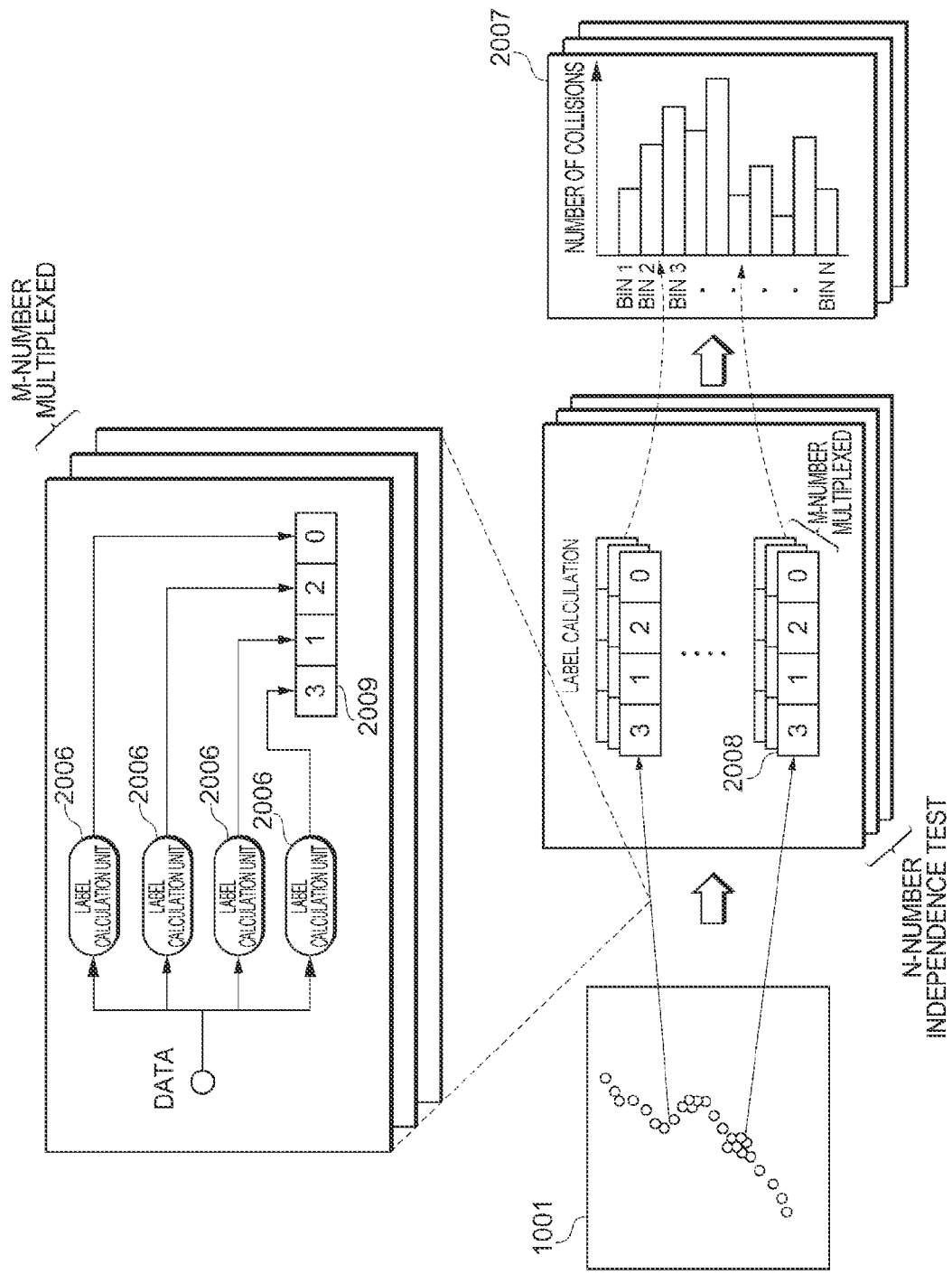
FIG. 3 is a diagram explaining the staying area detection operation performed by the staying area detection unit according to an embodiment of the present invention.

The staying area detection operation performed by the staying area detection unit 1003 is now explained in detail with reference to FIG. 3.

The probabilistic histogramming unit 2001 calculates the linked histogram 2007 relative to the input of the GPS log data 1001.

The probabilistic histogramming unit 2001 classifies the data so that they are registered in the same BIN (rank) with high probability as the distance between the data points is closer, and histograms such data. Consequently, since the data points belonging to an area where the data points are condensed will be registered in the same BIN with higher probability, it is possible to efficiently extract the area where the data points are condensed by sampling, in order, from the BIN in which the registration frequency of the data points is high.

Moreover, since the probabilistic histogramming unit 2001 merely calculates whether the respective data points are registered in which BIN, it is possible to suppress the computational effort, at most, to the number of data points, and the considerably reduction in the calculation time can be expected.

The label calculation unit 2006 calculates the multiplex label 2008 for each of the data points. The respective label calculation units 2006 calculate the numerical value to be into a single bit of the label 2009. The number of bits of the label 2009 corresponds to the number of label calculation units 2006 (4 bits in the example of FIG. 3).

Here, the data point to be input is one point of the D-dimensional vector space, and, as shown in Formula (1), the label calculation unit 2006 uses LSH (Locality Sensitive Hashing) and defines the data point as mapping from the D-dimensional Euclidean space to an integer value.

[Formula 1]

$$x \in R^D, f(x) = \left\lfloor \frac{a \cdot x + r}{W} \right\rfloor \mod C \quad (1)$$

However, R represents a real number, $\lfloor y \rfloor$ represents an integer value that does not exceed y, $a \in R^D$ represents the D-dimensional vector configured from random numbers according to a standard normal distribution N(0, 1) in which the respective components are independent, and r to U[0, W) represents a random number according to the uniform distribution in U[0, W). Moreover, $W \in R^D$ represents the window width, C represents the base (integer of 2 or more), and these are parameters to be set by the administrator. Based on this mapping, data points of arbitrary two points will have the same value with higher probability as the distance thereof is closer.

The consequent B bit size is the label 2009, and defined by Formula (2).

[Formula 2]

$$L^B(x) = \langle f_1(x), \ldots, f_B(x) \rangle \quad (2)$$

When data points of arbitrary two points are given, the probability that such data points have the same label (hereinafter referred to as the "collision probability") is obtained by Formula (3).

[Formula 3]

$$P(d) = Pr[\text{two points forming distance } d \text{ colliding}] = \quad (3)$$

$$\int_0^W \frac{1}{d} \sum_{k \in Z} \phi\left(\frac{CWk+t}{W}\right)\left(1 - \frac{t}{W}\right) dt$$

Figure 4:
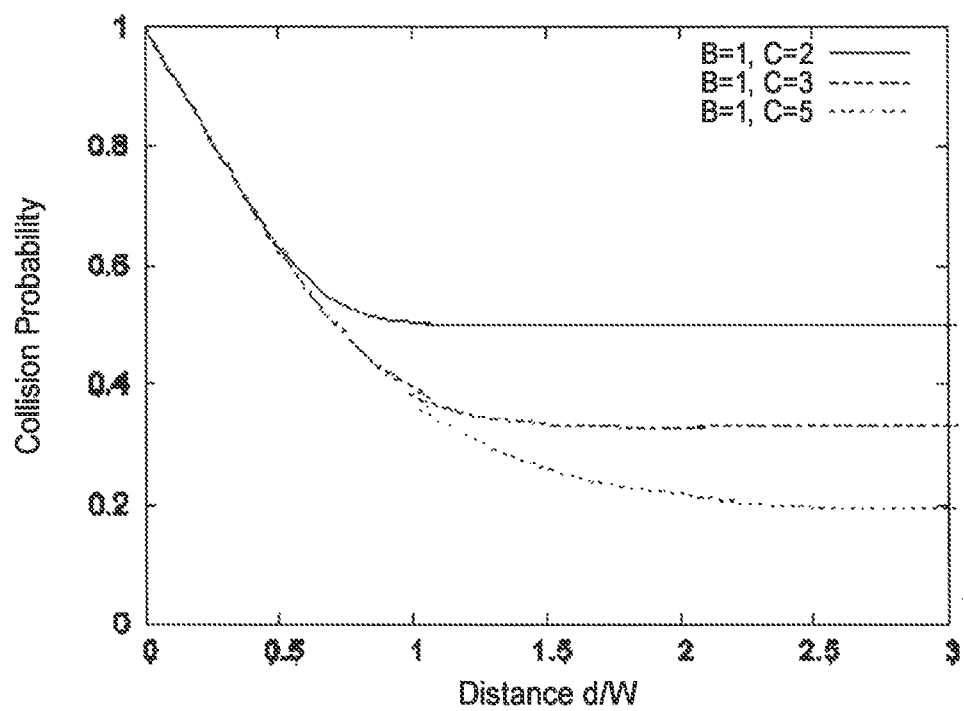
FIG. 4 is a graph showing the probability of two data points colliding.
Figure 5:
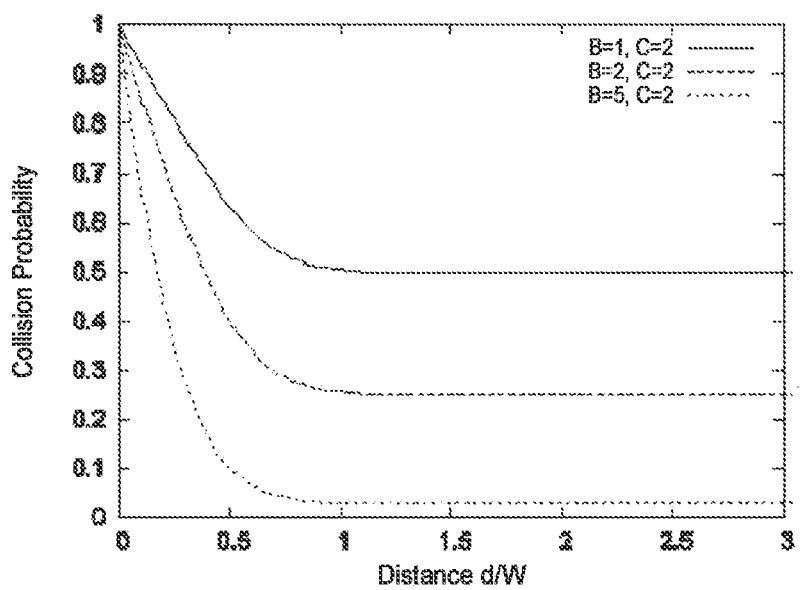
FIG. 5 is a graph showing the probability of two data points colliding.

However, Z represents the integer. FIGS. 4 and 5 are graphs which plot the probability of the two data points of distance d between the two points colliding relative to the distance that is normalized with W. As shown in the diagrams, while the collision probability decreases, nearly linearly, relative to the increase in the distance when the distance d is near zero, the collision probability converges to a fixed value $C^{-B}$ from around when d/W exceeds 1.

The multiplex label 2008 is defined by Formula (4) which multiplexes the results upon performing the label operation M-number of times independently.

[Formula 4]

$$CL^B = \{L_1^B(x), \ldots, L_M^B(x)\} \quad (4)$$

Figure 6:
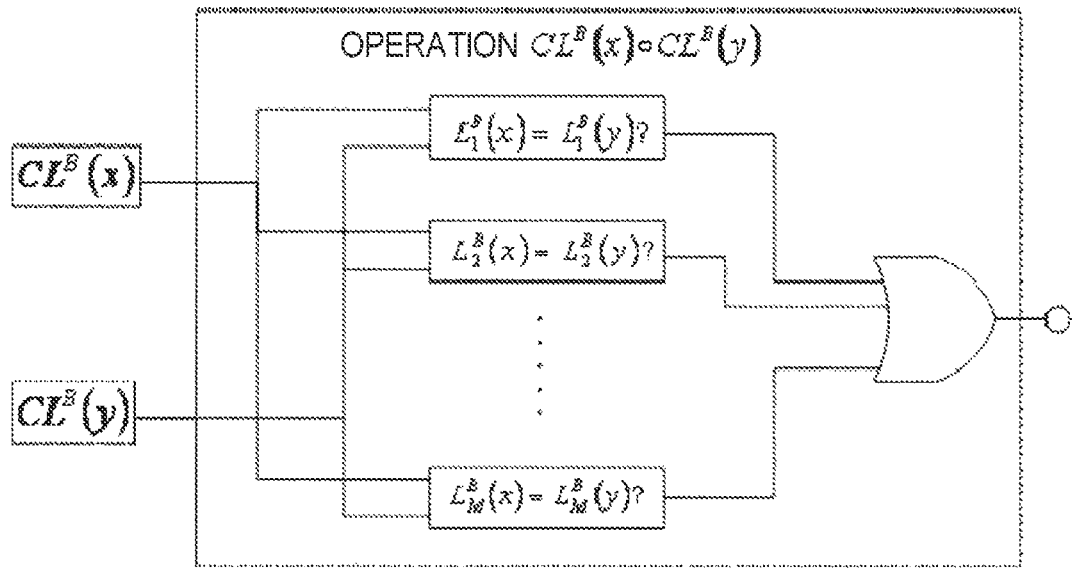
FIG. 6 is a diagram explaining the comparison operation of multiplex labels of this invention according to an embodiment of the present invention.

Here, the comparison operation shown in FIG. 6 is defined by Formula (5), and the collision of the multiplex labels 2008 is thereby defined.

[Formula 5]

$$CL^B(x) \cdot CL^B(y) \equiv \bigcup_{i=1}^M [L_i^B(x) = L_i^B(y)] = \quad (5)$$

$$\begin{cases} 0 & \left(\begin{array}{l} \forall i \in [1, \ldots, M], \\ L_i^B(x) \neq L_i^B(y) \end{array}\right) \ldots \text{Collision} \\ 1 & (\text{otherwise}) \ldots \text{Non-collision} \end{cases}$$

This is an operation where, among the labels configuring the multiplex label 2008, 1 is returned if where is even one label that is the same (multiplex label collision), and 0 is otherwise returned (multiplex label non-collision). Note that, while the inclusion of even one same label is defined as a collision, this reflects the fact that, if the same label is contained even once among the M-number of tests, the possibility that the distance of the two is close. Depending on the policy of the administrator, it is also possible to change the conditions to be stricter such as acknowledging the collision of multiplex labels only when all label collide.

As a result of examining the collision of the multiplex labels defined by Formula (5), it is possible to generate a histogram relative to the given dataset. As one method, the multiplex label of previously registered data points and comparison operation of Formula (5) are performed to the BIN of all histograms in which one or more data points are registered in a certain data point x, and if even one data point has collided such data point is newly added and registered in that BIN. If the is no corresponding BIN, then a BIN is newly created and the data point is registered therein.

Based on the foregoing processing, it is guaranteed that the data points registered in the same BIN will have a label that is common with at least one other data point. Moreover, registration of the data points is not limited to one BIN, and the data points may belong to a plurality of BINs.

In addition, as a stricter condition, it is possible to add data points to the BIN only when all data points in that BIN and the multiplex label collide. In the foregoing case, all data points registered in the same BIN will share at least one common label. This means that, among the M-number of tests, all data points have been assigned to the same label at least once.

While there will be a quantitative difference based on the foregoing collision/histogramming policy, the probability that the data belonging to the same BIN are close to each other will be high, and the data points belonging to the staying area will more likely belong to the same BIN in comparison to the data points of other areas. By using this tendency and performing sampling in order from the data points of the BIN in which the frequency of data point registration is high, it is possible to preferentially select the data points from areas of greater density.

Note that the number of BINs to be sampled may be set arbitrarily. For example, the number of BINs to be sampled may be the total number of data points to be extracted, or designated based on the number of BINs. Moreover, the number of BINs to be sampled may also be determined from the distribution of the frequency such as BINs having an average frequency or higher.

The linked histogram 2007 is obtained by repeating the foregoing processing independently N-number of times, and aims to improve the accuracy by linking the results based on the plurality of independent tests. Specifically, among the N-number of tests, the data points that are repeatedly registered in the BIN of higher registration frequency can be determined as belonging to an area of greater density, and can be differentiated from the data points belonging to an area, which is not that dense, as a result of accidental collision.

The data point group that was sampled based on the foregoing processing is classified into staying areas. One method is to classify the data point group into a staying area for each BIN. Nevertheless, with the foregoing method, data points that are close in terms of distance may not be of the same BIN, but are likely to belong to a peripheral BIN. For example, considered may be cases where the difference in the labels is small such as when only one bit in the label is changed from 3 to 2. In the foregoing case, since the data points of areas that can be deemed as being the same staying area may belong to different BINs, there is a possibility that the area classification in BIN units may be inappropriate.

Figure 7:
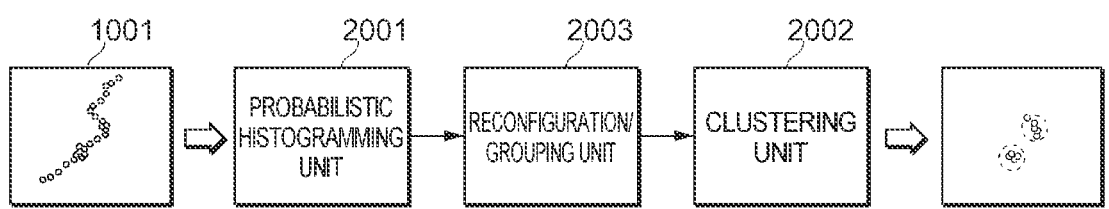
FIG. 7 is a diagram explaining the staying area detection method according to an embodiment of the present invention.

Thus, as shown in FIG. 7, a prescribed number of data points belonging to that BIN is extracted in order from those in which the frequency is high among the histograms obtained in the respective tests by the reconfiguration/grouping unit 2003, and the BINs with particularly high frequency among the above are classified as a high group, and the remainder is classified as a low group. In addition, the staying area is designated by the clustering unit 2002 configuring the clusters (second clustering) so as to satisfy the designated size or mutual distance from the data that were classified into a high group and a low group.

Figure 8:
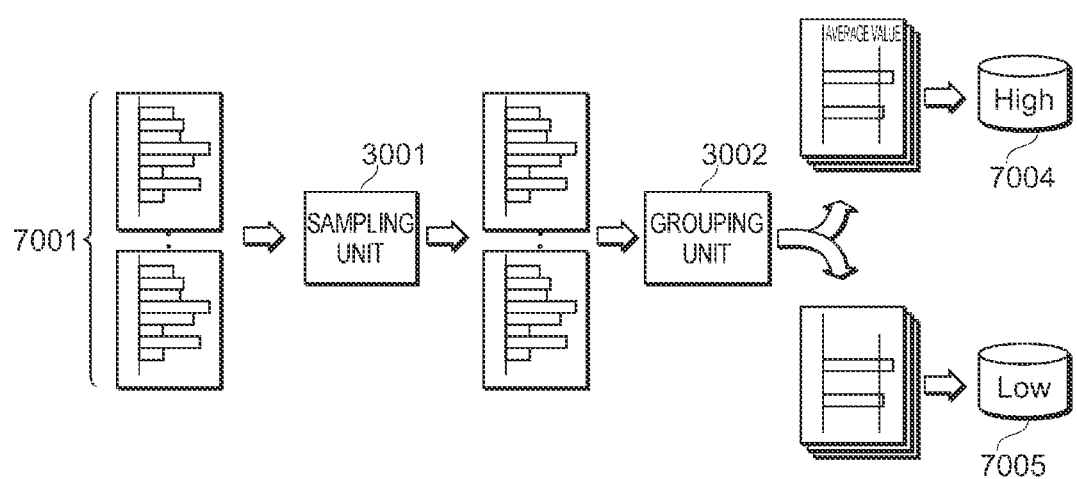
FIG. 8 is a diagram explaining the reconfiguration/grouping process of data points according to an embodiment of the present invention.

Foremost, the reconfiguration/grouping process of the sampled data points is now explained in detail with reference to FIG. 8.

The sampling unit 3001 of the reconfiguration/grouping unit 2003 selects the BINs having a large registration frequency in K-number of BINs set in advance relative to the inputs of the N-number of independent histograms 7001. The grouping unit 3002 classifies the BINs samples from the respective histograms into the two groups of high and low based on a predetermined threshold.

Here, a threshold is typically an average frequency, but is not necessarily limited thereto. In the example showing in the drawings, based on the average frequency, the BIN having a frequency that is higher than the average frequency is classified as high, and the BIN having a frequency that is lower than the average frequency is classified as low. Moreover, based on the foregoing classification, the grouping unit 3002 registers the data points registered in the respective BINs in a high group 7004 and a low group 7005. Here, while the same data from histograms having different test numbers will exist, redundant data may be deleted, or the redundancy may be permitted and registered since the number of redundancies suggests sampling from an area with greater density.

Figure 9:
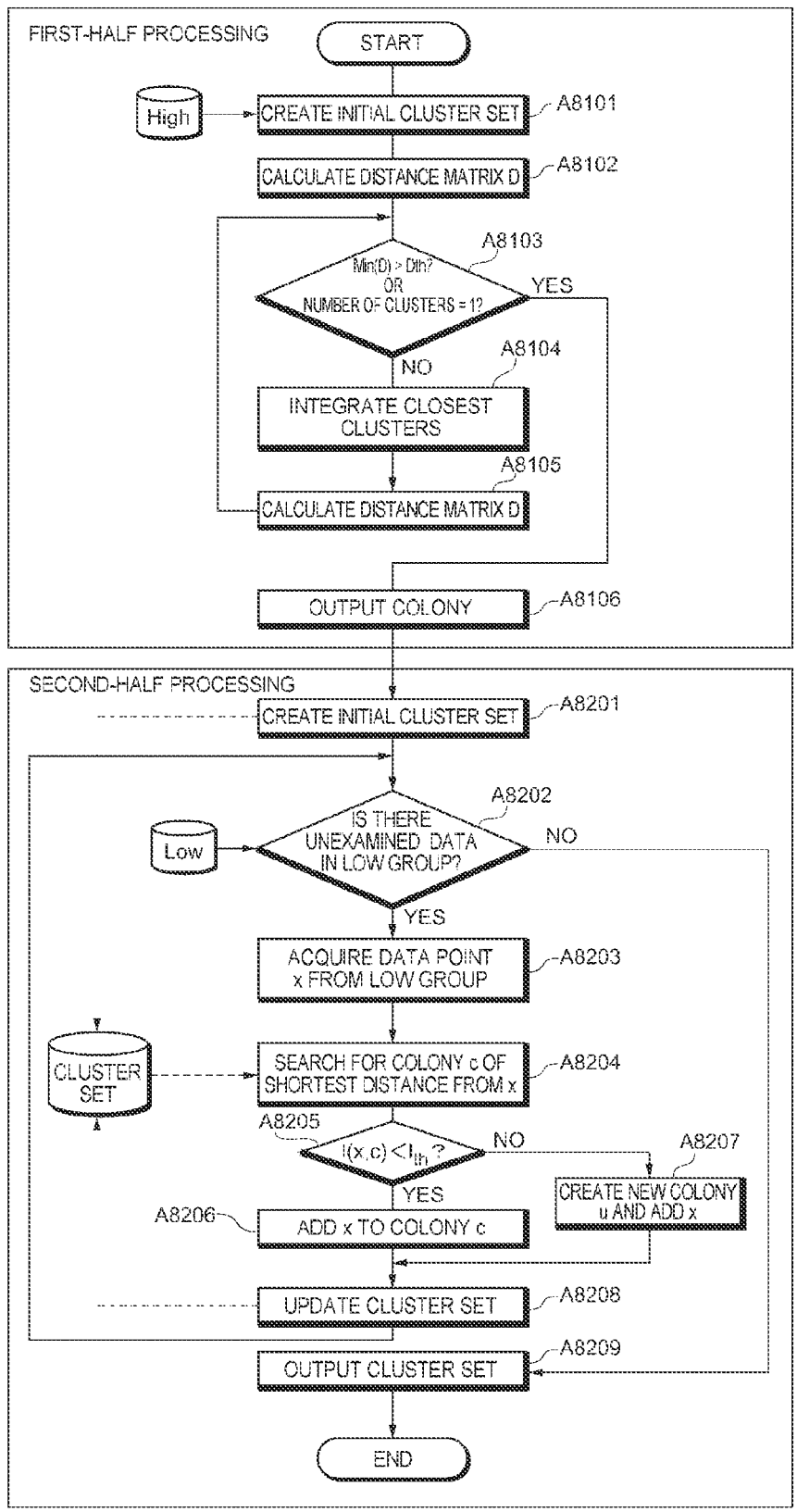
FIG. 9 is a flowchart of the operation of the clustering unit according to an embodiment of the present invention.

The operation of the clustering unit 2002 is now explained with reference to FIG. 9. The operation of the clustering unit 2002 is broadly separated into first-half processing and second-half processing. In the first-half processing, clustering based on cluster analysis is performed by using the data points belonging to the high group to create a basic colony. In the second-half processing, the data points belonging to the low group are newly added and registered to the basic colony.

Generally speaking, with the cluster analysis processing, the calculation time tends to drastically increase relative to the increase in the amount of data. Thus, by performing the cluster analysis processing in two stages as in this embodiment rather than by using all data points, it is possible to efficiently create the core portion of the staying area by only using the high group as data that was sampled from the area with greater density, and add the data points of the low group that were sampled from the area with relatively low density to that core portion. Consequently, it is possible to form the intended cluster while suppressing the increase in the calculation. In cases where the number of data points will not be a problem in terms of calculation time, it is also possible to register all data points in the high group, and only perform the first-half processing.

The first-half processing is now explained.

The first-half processing aims to perform cluster analysis processing to the data points of the high group and form a colony. Here, $I_{th}$ as the radius of the staying area to be ultimately formed and $D_{th}$ which defines the minimum distance between the staying areas are set in advance.

(Step A8101) The clustering unit 2002 creates an initial cluster set by using all data points registered in the high group. The initial cluster set is formed so that only one data point is contained in each cluster.

(Step A8102) The clustering unit 2002 calculates a distance matrix D having squared distance information between the initial cluster sets. Here, the squared distance between the initial clusters shall be the square of the Euclidean distance between the data points.

(Step A8103) The clustering unit 2002 proceeds to step A8106 when there is only one cluster, or when the relationship of the distance Min(D) between the minimum clusters and $D_{th}$ is Min(D)>$D_{th}$. Otherwise, the clustering unit 2002 proceeds to step A8104.

(Step A8104) The clustering unit 2002 creates a new cluster by integrating the two clusters that are closest to each other. The number of all clusters is decremented by one as a result of this operation.

(Step A8105) The clustering unit 2002 calculates the distance matrix D relative to the new cluster set that was decremented by one. Here, while the squared distance between the clusters can be defined based on various methods, as a representative method there is the Ward method or the centroid method. When the clusters before integration are p and q and the cluster after integration is t, the distance $D_{tr}^2$ between the cluster t and the other clusters r is calculated based on Formula (6) (Ward method) or Formula (7) (centroid method) by using the distances $D_{pr}^2, D_{qr}^2, D_{pq}^2$ between the clusters.

[Formula 6]

$$D_{tr}^2 = \frac{n_p + n_r}{n_t + n_r} \cdot D_{pr}^2 + \frac{n_q + n_r}{n_t + n_r} \cdot D_{qr}^2 - \frac{n_r}{n_t + n_r} \cdot D_{pq}^2 \quad (6)$$

[Formula 7]

$$D_{tr}^2 = \frac{n_p}{n_p + n_q} \cdot D_{pr}^2 + \frac{n_q}{n_p + n_q} \cdot D_{qr}^2 - \frac{n_p n_q}{n_p + n_q} \cdot D_{pq}^2 \quad (7)$$

However, $n_x$ is the number of data points of the cluster x. Moreover, the updating rule of the distance matrix is not limited to the Ward method or the centroid method.

(Step A8106) The clustering unit 2002 outputs the cluster set as a colony set. The colony set forms the core portion of the staying area, and the distance between the closest clusters is at least $D_{th}$ or more, or contains only one cluster. In the case of only containing one cluster, all data points are deemed data points belonging to the same staying area.

The second-half processing is now explained.

The second-half processing forms the ultimate staying area by adding a corresponding cluster when it is determined that the respective data points belonging to the low group belongs to one cluster in the cluster set formed in the first-half processing, and creating a new cluster and updating the cluster set when it is determined that the respective data points belonging to the low group do not belong to any of the clusters.

(Step A8201) The clustering unit 2002 foremost sets the colony set as the output of the first-half processing as an initial value of the cluster set 8001.

(Step A8202) The clustering unit 2002 checks whether there is any unexamined data point among the data points of the Low group. The clustering unit 2002 proceeds to step A8209 when there is no such unexamined data point, and proceeds to step A8203 when there is such an unexamined data point.

(Step A8203) The clustering unit 2002 acquires an unexamined data point x from the Low group.

(Step A8204) The clustering unit 2002 selects the cluster c that is closest to the data point x among the clusters of the cluster set 8001. Here, the distance I(x, c) of the data point x and the cluster c shall be the Euclidean distance of the central position of the cluster c (average position or position of the data point closest to the average position) and the data point x. Otherwise, the distance I(x, c) of the data point x and the cluster c may also be the distance of the data point closest to the data points in the cluster c and x, the distance of the farthest data point and x, or various other distances.

(Step A8205) The clustering unit 2002 compares I(x, c) and the pre-set $I_{th}$, determines that x is a data point that was sampled from the same staying area when I(x, c)<$I_{th}$, and proceeds to step A8206. Otherwise, the clustering unit 2002 determines that x is a data point that was sampled from a different staying area, and proceeds to step A8207.

(Step A8206) The clustering unit 2002 adds the data point x to the cluster c.

(Step A8207) The clustering unit 2002 creates a new cluster u, and registers the data point x.

(Step A8208) The clustering unit 2002 updates the cluster set 8001. The clustering unit 2002 thereafter returns to step A8202, and repeats the same processing until there are no more unexamined data points.

(Step A8209) The clustering unit 2002 outputs the cluster set 8001.

Based on the foregoing processing, an aggregate of clusters with a limited cluster radius and inter-cluster distance is output, and the respective clusters can be considered a staying area candidate of the GPS log data.

The representative point extraction unit 1004 extracts the representative points based on the foregoing method, calculates the score of the extracted representative points, and ranks the waypoints of all staying areas based on the scores relative to the clusters.

As explained above, according to this embodiment, since the staying time tends to be longer at places of interest to the user in comparison to other locations in the GPS log data, those places are considered waypoint candidates and ranked according to the density thereof. Consequently, since it is possible to efficiently extract the characteristic points that are unique to the GPS log data, it is possible to automatically extract and display locations that are possibly important to the user at that moment. The user can thereby efficiently extract points that are important to the user from the GPS log data without having to coordinate with a data of landmark-like spot information or user profile information. Thus, it is possible to considerably reduce costs required for processing, editing and using the GPS log data.

Note that, since the staying area can be determined based on the density of the data points, as a simpler method, it is also possible to adopt a method of considering a minimum area in which all points of the GPS log data will fit, dividing that area into small fixed cells, and create a histogram in which each cell is one BIN. While results can be obtained to a certain extent with this method, the size of the cells considerably affects the results, and there is dependency on the method of marking the boundary of the cells. Thus, it does not necessarily mean that good results cannot be obtained unless consideration is given to the nature (range, density and the like) of the GPS log data. Meanwhile, when the width of the respective cells is set randomly, much time is required for calculating the staying area.

Moreover, for instance, even when the data points are extracted randomly, while it is possible to consider a method of extracting the staying area by using the fact that the staying area has higher probability of being sampled than the other areas (mere passing areas), in this case also, the accuracy will deteriorate unless the difference in the number of data points between the staying area and the passing area is great. In this embodiment, upon calculating the density of the data points, the absolute coordinate values of the individual data points are not a problem, and since a probabilistic sampling method, which uses the fact that only the distance with the other data points is important, is adopted, the greater the number of data points of mutually near distances, the probability of being extracted as a staying area will increase. Thus, it is possible to accurately and efficiently extract appropriate waypoints.

Moreover, since the clustering unit 2002 performs the sampling from areas of high density with higher probability, matching with databases or information such as the distance between all data points is not required and, therefore, the computational effort can be suppressed relative to the increase in the data amount. Thus, upon automatically detecting the waypoints, it is possible to keep the calculation cost low even when the data amount increases. Thus, response to the user is fast and the user can obtain the waypoint candidates without stress.

In this embodiment, the main processing which determines the calculation time is the processing of the staying area detection unit 1003, and more specifically is the processing of the probabilistic histogramming unit 2001 and the first-half processing of the clustering unit 2002. The calculation time of the clustering unit 2002 can be adjusted by restricting the number of data points of the high group according to the capability of the computer. When there are an extremely large number of input data, the calculation time of the probabilistic histogramming unit 2001 can be adjusted by foremost performing random sampling, and the narrowing the number of data points up to a number according to the capability of the computer. More desirably, by adopting a method where the area is divided into large fixed cells as the pre-processing, and performing random sampling from the cells containing a large number of data points with higher probability, it is possible to further improve the accuracy.

In addition, among the areas that are determined to be a staying area, there are locations where the user intentionally stayed, and locations where the user stayed unintentionally such as upon waiting at stoplights. In the foregoing case, the former should be detected preferentially. Thus, for example, by calculating the labels of landmark-like spots in advance and increasing the weight of the BIN of the data points that collided with that data by one data point, and causing the level of the BIN (weighted frequency) to be higher even in cases where the number of data is the same, it is possible to perform preferential detection.

Moreover, by incorporating the user's preference information from the user profile or the like, and weighting the data points registered in the same BIN as the spots that were previously determined as being favorable by the user, it is possible to add preference information that is unique to that user. According to this method, while much calculation time was required for database coordination and use profile coordination in conventional methods, the staying area can be extracted while coordinating with the database and user profile information with the same online processing time.

A working example of the present invention is now explained with reference to FIG. 10.

Figure 10:
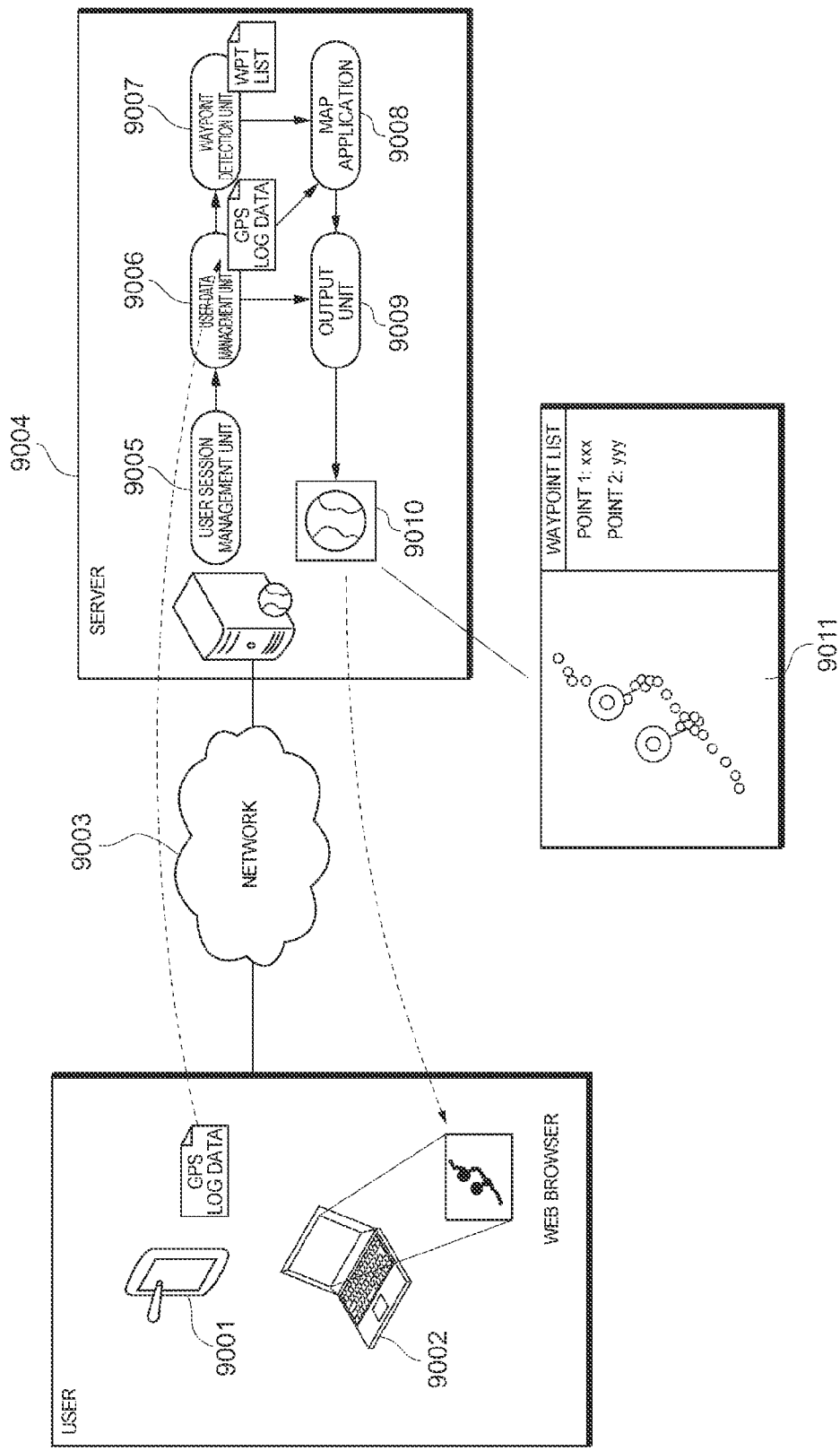
FIG. 10 is a block diagram showing a configuration of a working example of the present invention.

FIG. 10 is a diagram showing a configuration of the computer system including a server 9004 in which the characteristic point detection system of the present invention was applied to the waypoint detection unit 9007. As shown in the diagram, a recording device 9001 for recording the user's GPS log data, a computer 9002 for uploading the GPS log data and displaying the processed data, and a server 9004 are connected via a network 9003.

The server 9004 comprises a user session management unit 9005, a user data management unit 9006, a waypoint detection unit 9007, a map application 9008, and an output unit 9009, and generates output data 9010 written in a data format as represented by xml or html relative to the user's GPS log data input. The user can peruse the output data 9010 via the network by using a software program such as the web browser operating on the computer 9002.

The server 9004 performs user authentication or connection management with the user based on the user session management unit 9005. The user data management unit 9006 manages page information that was customized for the user and, for example, organizes the previously uploaded information chronologically in a calendar and stores the same in a manner that can be easily perused by the user. Moreover, while not shown in the diagram, a database of the user data may also be provided as needed.

The user data management unit 9006 calls the waypoint detection unit 9007 in response to the upload of new GPS log data by the user, and creates the waypoint list. The GPS log data and the calculated waypoint list are input to the map application 9008, and the track of the GPS log data is displayed on the map, and the waypoints are displayed on the track.

The output data 9010 is, for example, as shown on the output data display page 9011, a result of overlapping and displaying the waypoints shown as pins on the track of the data points of the GPS log data. Moreover, a list of the detailed information of the waypoints may also be displayed together. The user may use the computer 9002 and acquire the output data 9010 via the network 9003 and peruse the same. This series of processing can be realized with high responsiveness based on the processing of the waypoint detection unit 9007 of the server 9004.

This application relates to and claims priority from Japanese Patent Application No. 2010-110361, filed on May 12, 2010, the entire disclosure of which is incorporated herein by reference.

While the present invention was explained with reference to the foregoing embodiment, the present invention is not limited to such embodiments. The configuration and details of the present invention may be variously changed in a manner that is understood by persons skilled in the art within the scope of the present invention.

A part or all of the foregoing embodiments may be as described in the following Note, but are not limited thereto.

(Note 1) A characteristic point detection system, comprising:

a staying area detection unit which performs clustering based on distribution of data points contained in GPS log data of a user, determines an index showing a staying time of the user in a cluster based on the number of data points contained in each cluster, extracts one or more clusters based on the index, and forms a staying area of the user based on the extracted clusters, wherewith a cluster is extracted with higher probability as the staying time is longer;

a representative point extraction unit which extracts, one at a time, a representative point of the staying area from each of the extracted staying areas, and determines a score of each of the representative points based on density of the data points in each of the staying areas; and a representative point ranking unit which outputs a list ranking each of the representative points based on the score.

(Note 2) The characteristic point detection system according to Note 1, wherein the staying area detection unit comprises a probabilistic histogramming unit which generates a histogram by classifying a first data point and a second data point so that the first and second points belong to a same rank at higher probability as a distance between the two data points is shorter, and associates each rank of the histogram with the cluster and determines a frequency of each rank to be an index showing the staying time.

(Note 3) The characteristic point detection system according to Note 2, wherein the staying area detection unit extracts a rank corresponding to a cluster in which the staying time is long among the respective ranks of the histogram generated by the probabilistic histogramming unit, and forms the staying area by performing second clustering to data points belonging to the extracted rank.

(Note 4) The characteristic point detection system according to Note 2, wherein the staying area detection unit comprises:

a reconfiguration/grouping unit which extracts a rank corresponding to a cluster in which the staying time is long among the respective ranks of the histogram generated by the probabilistic histogramming unit, and divides the extracted ranks into two groups based on whether the staying time is long or short; and a clustering unit which forms a staying area by using data points belonging to a rank of a group, in which the staying time is longer, of the two groups, and thereafter adding data points belonging to a rank of another group or forming a new staying area.

(Note 5) The characteristic point detection system according to any one of Notes 2 to 4, wherein the probabilistic histogramming unit determines a rank to which each of the data points belongs by using a label that is given to each data point by using LSH (Locality Sensitive Hashing).

(Note 6) The characteristic point detection system according to any one of Notes 1 to 5, wherein the staying area detection unit performs the clustering to at least either data points corresponding to a spot corresponding to a landmark or data points corresponding to a spot which matches the user's preference, and performs weighting so that probability extracting the cluster containing the data points is increased.

(Note 7) The characteristic point detection system according to any one of Notes 1 to 6, wherein the staying area detection unit extracts the staying area after randomly sampling the GPS log data and reducing the number of data points.

(Note 8) The characteristic point detection system according to any one of Notes 1 to 7, wherein the staying area detection unit divides, into a plurality of fixed areas, an overall area defined by a minimum range containing all data points contained in the GPS log data, extracts data points with higher probability for fixed areas in which the number of data points belonging to the fixed area is high, and performs clustering by using the extracted data points.

(Note 9) A characteristic point detection method, comprising:

a step of performing clustering based on distribution of data points contained in GPS log data of a user, determining an index showing a staying time of the user in a cluster based on the number of data points contained in each cluster, extracting one or more clusters based on the index, and forming a staying area of the user based on the extracted clusters, wherewith a cluster is extracted with higher probability as the staying time is longer;

a step of extracting, one at a time, a representative point of the staying area from each of the extracted staying areas, and determining a score of each of the representative points based on density of the data points in each of the staying areas; and a step of outputting a list ranking each of the representative points based on the score.

(Note 10) A program which causes a computer to function as:

a staying area detection unit which performs clustering based on distribution of data points contained in GPS log data of a user, determines an index showing a staying time of the user in a cluster based on the number of data points contained in each cluster, extracts one or more clusters based on the index, and forms a staying area of the user based on the extracted clusters, wherewith a cluster is extracted with higher probability as the staying time is longer;

a representative point extraction unit which extracts, one at a time, a representative point of the staying area from each of the extracted staying areas, and determines a score of each of the representative points based on density of the data points in each of the staying areas; and a representative point ranking unit which outputs a list ranking each of the representative points based on the score.

The present invention is suitable for detecting appropriate waypoints from the GPS log data in a highly accurate and responsive manner.

100 characteristic point detection system
1001 input data
1002 input unit
1003 staying area detection unit
1004 representative point extraction unit
1005 output unit
1006 WPT list
1007 map application
1008 output data
2001 probabilistic histogramming unit
2002 clustering unit
2003 reconfiguration/grouping unit
2004 linked histogram creation unit
2005 multiplex label calculation unit
2006 label calculation unit
2007 linked histogram
2008 multiplex label
2009 label
3001 sampling unit
3002 grouping unit
7001 N-number of independent histograms
7004 high group
7005 low group
9001 recording device
9002 computer
9003 network
9004 server
9005 user session management unit
9006 user data management unit
9007 waypoint detection unit
9008 map application
9009 output unit
9010 output data
9011 display page

I claim:

1. A characteristic point detection system, comprising:
a staying area detection unit which performs clustering based on distribution of data points contained in GPS log data of a user, determines an index showing a staying time of the user in a cluster based on the number of data points contained in each cluster, extracts one or more clusters based on the index, and forms a staying area of the user based on the extracted clusters, wherewith a cluster is extracted with higher probability as the staying time is longer;

a representative point extraction unit which extracts, one at a time, a representative point of the staying area from each of the extracted staying areas, and determines a score of each of the representative points based on density of the data points in each of the staying areas; and a representative point ranking unit which outputs a list ranking each of the representative points based on the score.

2. The characteristic point detection system according to claim 1, wherein the staying area detection unit comprises a probabilistic histogramming unit which generates a histogram by classifying a first data point and a second data point so that the first and second points belong to a same rank at higher probability as a distance between the two data points is shorter, and associates each rank of the histogram with the cluster and determines a frequency of each rank to be an index showing the staying time.

3. The characteristic point detection system according to claim 2, wherein the staying area detection unit extracts a rank corresponding to a cluster in which the staying time is long among the respective ranks of the histogram generated by the probabilistic histogramming unit, and forms the staying area by performing second clustering to data points belonging to the extracted rank.

4. The characteristic point detection system according to claim 2, wherein the staying area detection unit comprises:

a reconfiguration/grouping unit which extracts a rank corresponding to a cluster in which the staying time is long among the respective ranks of the histogram generated by the probabilistic histogramming unit, and divides the extracted ranks into two groups based on whether the staying time is long or short; and a clustering unit which forms a staying area by using data points belonging to a rank of a group, in which the staying time is longer, of the two groups, and thereafter adding data points belonging to a rank of another group or forming a new staying area.

5. The characteristic point detection system according to claim 2, wherein the probabilistic histogramming unit determines a rank to which each of the data points belongs by using a label that is given to each data point by using LSH (Locality Sensitive Hashing).

6. The characteristic point detection system according to claim 1, wherein the staying area detection unit performs the clustering to at least either data points corresponding to a spot corresponding to a landmark or data points corresponding to a spot which matches the user's preference, and performs weighting so that probability of extracting the cluster containing the data points is increased.

7. The characteristic point detection system according to claim 1, wherein the staying area detection unit extracts the staying area after randomly sampling the GPS log data and reducing the number of data points.

8. The characteristic point detection system according to claim 1, wherein the staying area detection unit divides, into a plurality of fixed areas, an overall area defined by a minimum range containing all data points contained in the GPS log data, extracts data points with higher probability for fixed areas, in which the number of data points belonging to the fixed area is high, and performs clustering by using the extracted data points.

9. A characteristic point detection method, comprising:

a step of performing clustering based on distribution of data points contained in GPS log data of a user, determining an index showing a staying time of the user in a cluster based on the number of data points contained in each cluster, extracting one or more clusters based on the index, and forming a staying area of the user based on the extracted clusters, wherewith a cluster is extracted with higher probability as the staying time is longer;

a step of extracting, one at a time, a representative point of the staying area from each of the extracted staying areas, and determining a score of each of the representative points based on density of the data points in each of the staying areas; and a step of outputting a list ranking each of the representative points based on the score.

10. A non-transitory computer readable medium storing a program which causes a computer to perform operations comprising:

performing clustering based on distribution of data points contained in GPS log data of a user, determining an index showing a staying time of the user in a cluster based on the number of data points contained in each cluster, extracting one or more clusters based on the index, and forming a staying area of the user based on the extracted clusters, wherewith a cluster is extracted with higher probability as the staying time is longer;

extracting, one at a time, a representative point of the staying area from each of the extracted staying areas, and determining a score of each of the representative points based on density of the data points in each of the staying areas; and outputting a list ranking each of the representative points based on the score.

11. A characteristic point detection system, comprising:

a staying area detection unit which performs clustering based on distribution of data points contained in GPS log data of a user, extracts one or more clusters based on the number of data points contained in each cluster, and forms a staying area of the user based on the extracted clusters;

a representative point extraction unit which extracts a representative point of the staying area from each of the extracted staying areas, and determines a score of each of the representative points; and an output unit which outputs the representative point based on the score.

12. A characteristic point detection method, comprising:

a step of performing clustering based on distribution of data points contained in GPS log data of a user, extracting one or more clusters based on the number of data points contained in each cluster, and forming a staying area of the user based on the extracted clusters;

a step of extracting a representative point of the staying area from each of the extracted staying areas, and determining a score of each of the representative points; and a step of outputting the representative point based on the score.

13. A non-transitory computer readable storage medium storing a program which causes a computer to perform operations comprising:

performing clustering based on distribution of data points contained in GPS log data of a user, extracting one or more clusters based on the number of data points contained in each cluster, and forming a staying area of the user based on the extracted clusters;

extracting a representative point of the staying area from each of the extracted staying areas, and determining a score of each of the representative points; and outputting the representative point based on the score.

* * * * *